US008837327B2

(12) United States Patent
Liu et al.

(10) Patent No.: US 8,837,327 B2
(45) Date of Patent: Sep. 16, 2014

(54) METHOD AND DEVICE FOR MANAGING NETWORK TOPOLOGY STRUCTURE OF MACHINE TO MACHINE NETWORK

(75) Inventors: Yang Liu, Shenzhen (CN); Nan Li, Shenzhen (CN); Yuqin Chen, Shenzhen (CN); Feng Xie, Shenzhen (CN); Lin Chen, Shenzhen (CN); Ling Xu, Shenzhen (CN); Huiying Fang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 68 days.

(21) Appl. No.: 13/636,709

(22) PCT Filed: Jun. 4, 2010

(86) PCT No.: PCT/CN2010/073539
§ 371 (c)(1),
(2), (4) Date: Sep. 24, 2012

(87) PCT Pub. No.: WO2011/116549
PCT Pub. Date: Sep. 29, 2011

(65) Prior Publication Data
US 2013/0010646 A1    Jan. 10, 2013

(30) Foreign Application Priority Data
Mar. 25, 2010    (CN) .......................... 2010 1 0141517

(51) Int. Cl.
| | |
|---|---|
| *H04L 12/28* | (2006.01) |
| *H04W 4/00* | (2009.01) |
| *H04L 12/24* | (2006.01) |
| *H04W 40/24* | (2009.01) |
| *H04L 29/08* | (2006.01) |
| *H04W 36/00* | (2009.01) |
| *H04W 84/18* | (2009.01) |
| *H04L 12/717* | (2013.01) |

(52) U.S. Cl.
CPC ............. *H04L 41/042* (2013.01); *H04W 4/005* (2013.01); *H04W 40/248* (2013.01); *H04W 36/0083* (2013.01); *H04L 67/125* (2013.01); *H04W 84/18* (2013.01); *H04L 45/42* (2013.01); *H04L 41/12* (2013.01)
USPC ........................................... 370/255; 370/400

(58) Field of Classification Search
CPC ........ H04L 45/02; H04L 41/12; H04W 84/18
USPC ................ 370/255, 258, 328, 335–336, 338, 370/342–343, 345–346, 352–356, 389, 392, 370/428, 432, 441–442
See application file for complete search history.

(56) References Cited

U.S. PATENT DOCUMENTS

| | | | | |
|---|---|---|---|---|
| 5,687,168 | A  * | 11/1997 | Iwata ............................. | 370/255 |
| 6,654,802 | B1 * | 11/2003 | Oliva et al. .................... | 709/224 |
| 6,662,016 | B1 * | 12/2003 | Buckham et al. ............. | 455/457 |
| 6,704,292 | B1 * | 3/2004 | Valentine et al. ............. | 370/255 |
| 6,804,712 | B1 * | 10/2004 | Kracht .......................... | 709/223 |
| 7,203,175 | B2 * | 4/2007 | Thubert et al. ................ | 370/254 |
| 7,327,683 | B2 * | 2/2008 | Ogier et al. ................... | 370/236 |
| 7,660,287 | B2 * | 2/2010 | Axelsson et al. ............. | 370/338 |
| 7,957,356 | B2 * | 6/2011 | Wang et al. ................... | 370/338 |
| 8,160,729 | B2 * | 4/2012 | Ahmed ............................ | 700/47 |
| 2003/0007461 | A1* | 1/2003 | Chen et al. .................... | 370/254 |
| 2004/0003111 | A1* | 1/2004 | Maeda et al. ................. | 709/237 |
| 2007/0097883 | A1* | 5/2007 | Liu et al. ....................... | 370/254 |
| 2010/0085878 | A1* | 4/2010 | McDade et al. .............. | 370/242 |
| 2010/0157895 | A1* | 6/2010 | Pani et al. ..................... | 370/328 |
| 2010/0208621 | A1* | 8/2010 | Morper ......................... | 370/255 |
| 2010/0278118 | A1* | 11/2010 | Gossain et al. ............... | 370/329 |
| 2011/0016199 | A1* | 1/2011 | De Carlo et al. ............. | 709/220 |

FOREIGN PATENT DOCUMENTS

| | | |
|---|---|---|
| CN | 101083618 A | 12/2007 |
| CN | 101287178 A | 10/2008 |
| CN | 101360011 A | 2/2009 |
| CN | 101448275 A | 6/2009 |
| WO | 2008077879 A1 | 7/2008 |

OTHER PUBLICATIONS

Wireless Mobile Station for Supporting Large-Capacity Mobile Grid Network, Hu et al., Dec. 5, 2007, pp. 1-6. (Translation of Chinese Patent Application, CN101083618 A).*

International Search Report in international application No. PCT/CN2010/073539, mailed on Jan. 6, 2011.
English Translation of the Written Opinion of the International Search Authority in international application No. PCT/CN2010/073539, mailed on Jan. 6, 2011.

* cited by examiner

*Primary Examiner* — Kevin Mew
(74) *Attorney, Agent, or Firm* — Oppedahl Patent Law Firm LLC (57) ABSTRACT

The disclosure discloses a method for managing network topology structure of a Machine to Machine (M2M) network. The method mainly includes: a control station of the M2M network obtains wireless link information of the M2M network; the control station completes establishment and/or adjustment of the network topology structure of the M2M network according to the obtained wireless link information. The disclosure also provides a device for managing network topology structure of an M2M network. By the disclosure, performing self-adaptive management on numerous terminals can be realized by the M2M network; by applying the disclosure to the wireless network management of the M2M network, manpower cost is saved and working efficiency is improved, and also it is of important significance to the smooth development of the telecom operation.

12 Claims, 3 Drawing Sheets

METHOD AND DEVICE FOR MANAGING NETWORK TOPOLOGY STRUCTURE OF MACHINE TO MACHINE NETWORK

TECHNICAL FIELD

The disclosure relates to network topology management technology, in particular to a method and device for managing network topology structure of a machine to machine network.

BACKGROUND

At present, the concept of Machine to Machine network (M2M network) appears in the development of communication systems; M2M network, which is also called ubiquitous network, is a communication network between/among machines. The achievement of communication between/among machines means that there are networking and communication capabilities between devices or tools not networked traditionally, such as household appliances, security system equipment, factory equipments and medical instruments. For example, if an M2M network is used for data acquisition, it may be applied in many scenarios: operation monitoring of electric power equipments, remote meter data reading of electric power users, streetlamp management, illegal driving surveillance of motor vehicles, hydrological monitoring, meteorological monitoring, environmental monitoring, management of automatic ticket vending machines, monitoring of unattended places such as warehouses, office buildings or street shops, production monitoring of oil fields, intelligent management of urban traffic, management of other remote devices, and acquisition of other remote data. It can be imaged that the number of terminals in the M2M network will be quite huge as the number of machines in many scenarios is growing.

Terminals in the M2M network may be directly accessed to the control station of the wireless communication system, and also may be accessed to the control station of the wireless communication system via a gateway. Wherein the gateway may be the control station customized by the wireless communication system, and also may be a terminal in the wireless communication system, which serves as a temporary control station.

At present, performing self-adaptive management on numerous terminals by the wireless network system of the M2M network has not yet been realized. As the M2M network includes numerous terminals, which makes the wireless network management of the M2M network become quite complicated. During the practical application, the wireless network management of the M2M network can only be achieved manually, while for manual management, huge workloads are produced, furthermore, manpower and material resources are consumed, and working efficiency is low.

SUMMARY

Therefore, the disclosure aims to provide a method and device for managing network topology structure of an M2M network, so that performing self-adaptive automatic management on numerous terminals by the M2M network system can be realized.

In order to achieve the above purpose, the technical solution of the disclosure is implemented as follows.

The disclosure provides a method for managing network topology structure of an M2M network, the method includes: a control station of the M2M network obtains wireless link information of the M2M network; the control station completes establishment and/or adjustment of network topology structure of the M2M network according to the obtained wireless link information.

In the solution, the process of obtaining wireless link information of the M2M network may include: the control station obtains wireless link information of links between the control station and subordinate nodes directly connected with the control station; each sub-control station in subordinate nodes of the control station obtains wireless link information of links between each sub-control station and subordinate nodes directly connected with each sub-control station, and reports the obtained wireless link information to the control station.

In the solution, the process that the control station or sub-control station obtains wireless link information of links between the control station or sub-control station and subordinate nodes thereof may include: the control station or each sub-control station sends a detection signal to subordinate nodes directly connected with the control station or each sub-control station via a downlink; the subordinate nodes detect the state of links, and feed back detection results containing wireless link information to the control station or sub-control station via an uplink.

In the solution, the way of reporting wireless link information to the control station by the sub-control station may include: periodically reporting, and/or reporting after periodically polling of the control station, and/or reporting in response to request of the control station, and/or non-periodically initiative reporting.

In the solution, the process that the control station completes establishment of network topology structure of the M2M network may include: the control station identifies a sub-control station and/or terminal that newly accesses the network according to the obtained wireless link information, and completes access of a new terminal and/or new gateway to the network and access of the new terminal to the sub-control station.

In the solution, the process that the control station completes adjustment of network topology structure of the M2M network comprises: the control station completes handover of each terminal in the M2M network and access of a gateway to the network and/or quit of a gateway from the network according to the obtained wireless link information.

In the solution, the process of obtaining wireless link information of the M2M network may include: after accessing the network, a sending node in the M2M network sends a detection signal to each receiving node; after receiving the detection signal, each receiving node feeds back signal receiving strength of the detection signal which serves as wireless link information to each sending node; each sending node performs operation on the signal receiving strength fed back by each receiving node, and sends an operation result to the control station.

In the solution, the process that the control station completes establishment and/or adjustment of network topology structure of the M2M network may include: the control station selects a node with the most balanced signal receiving strength as the sub-control station, or selects a node with the maximum signal receiving strength as the sub-control station, according to the operation result sent by each sending node.

In the solution, when it is needed to replace a sub-control station or a sub-control station quits from the M2M network, the management of network topology structure of the M2M network may include: the control station obtains wireless link information of the M2M network, and according to the wireless link information, adjusts the sub-control station of the M2M network and determines a new sub-control station, so that the new sub-control station obtains the control over subordinate nodes of the original sub-control station.

In the solution, the method may further include: after establishing and/or adjusting the network topology structure, the control station sends the network topology information obtained during establishment of the network topology structure and/or network topology information updated during adjustment of the network topology structure to subordinate nodes or each node in the M2M network.

In the solution, the way of sending the network topology information may include: broadcast, and/or multicast, and/or unicast.

In the solution, the wireless link information comprises one or more of the following parameters: channel signal to interference ratio and/or signal to noise ratio and/or signal to interference plus noise ratio, packet loss ratio and/or packet error ratio of wireless links, processing of wireless links and/or transmission delay, actual throughput of wireless links, resources configured for wireless links, signal receiving strength information of terminals, signal sending strength information of terminals, and information of whether terminal communication links exist.

The disclosure also provides a device for managing network topology structure of an M2M network, the device includes: an obtaining unit and a processing unit, wherein: the obtaining unit is configured to obtain wireless link information of the M2M network; the processing unit is configured to complete establishment and/or adjustment of network topology structure of the M2M network according to the wireless link information obtained by the obtaining unit.

According to the method and device for managing network topology structure of an M2M network in the disclosure, the control station of the M2M network obtains wireless link information, and completes establishment and/or adjustment of the network topology structure of the M2M network according to the obtained wireless link information, so that performing self-adaptive automatic management on numerous terminals by the M2M network can be realized. By applying the disclosure to the wireless network management of the M2M network, manpower cost and material resources are saved and working efficiency is improved, and also it is of important significance to the smooth development of the telecom operation.

DETAILED DESCRIPTION

The specific implementation way of the technical solution of the disclosure will be described in detail with reference to drawings.

In an M2M network, a subordinate terminal or gateway of a control station can serve as a sub-control station, and the sub-control station and its subordinate terminal or gateway form a wireless transmission sub-network. The basic concept of the disclosure is that: each sub-control station creates network topology structure of a wireless transmission sub-network in which each sub-control station is located, and/or takes charge of adjusting the network topology structure of the wireless transmission sub-network, and reports the network topology information to the control station; and then the control station completes the update of the network topology information of the M2M network, and then the creation and/or adjustment of the network topology structure of the M2M network can be achieved.

Figure 1:
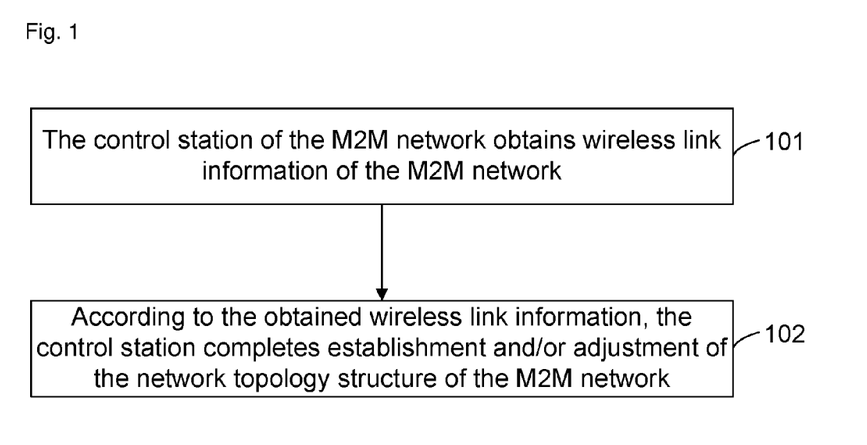
FIG. 1 is a flowchart of a method for managing network topology structure of an M2M network according to the disclosure.

The disclosure provides a method for managing network topology structure of an M2M network, as shown in FIG. 1, the method mainly includes the following steps:

Step 101: the control station of the M2M network obtains wireless link information of the M2M network.

Here, the obtained wireless link information is information of wireless links between is nodes in the M2M network, information of wireless link may include one or more of the following parameters: channel signal to interference ratio and/or signal to noise ratio and/or signal to interference plus noise ratio, packet loss ratio and/or packet error ratio of wireless links, processing of wireless links and/or transmission delay, actual throughput of wireless links, resources configured for wireless links, signal receiving strength indication of terminals, signal sending strength information of terminals, and information indicating whether terminal communication links exist.

Wherein as the position of each node such as sub-control station and terminal in the M2M network is relatively fixed, during practical application, the wireless link information is usually pre-configured in the sub-control station or terminal, and the control station may obtain the wireless link information from the node in the M2M network.

Here, the pre-configuration of the wireless link information may be completed manually when the sub-control station or terminal is configured, or completed when the sub-control station or terminal is manufactured, and also may be automatically configured via an air interface when the sub-control station or terminal is initialized, the specific configuration process belongs to the prior art and will not be described again here.

Wherein wireless link information, such as signal receiving strength indication of terminals and signal sending strength information of terminals, may be obtained by sending a detection signal between the control station and each node or between nodes.

Specifically, the control station may send a detection signal to each node, and then each node feeds back its own wireless link information, such as signal receiving strength information of terminals, to the control station according to the detection signal; or, the control station may specify a receiving node for the wireless link information in the M2M network, and then the receiving node obtains the wireless link information and sends the wireless link information to the control station.

Step 102: according to the obtained wireless link information, the control station completes establishment and/or adjustment of the network topology structure of the is M2M network.

Here, establishment and/or adjustment of the topology structure of the M2M network may include: the connection relation between any two nodes in the M2M network is established or adjusted, and/or nodes at the two ends of any wireless link in the M2M network are determined or adjusted.

Specifically, after the control station obtains the wireless link information, each node accesses the current M2M network via a wireless link between the node and the control station, the control station identifies each node according to the obtained wireless link information, completes establishment of the topology structure of the M2M network, updates the topology structure information of the current M2M network, and notifies each node in the current M2M network.

Wherein, as there are many terminals in the M2M network and the terminals are unattended, the method further includes: each node in the M2M network, such as terminal, sends a test report to the control station periodically, in order to report the position and function of the node to the terminal in real time. The control station may determine whether each node in the M2M network has problems such as position abnormality or function fault by periodically detecting whether the test report from each node is received, or may determine whether each current node has problems such as position abnormality or function fault according to the test report, if there are problems, the control station adjusts the current network topology structure of the M2M network, updates the current network topology structure information, and notifies each node in the M2M network, otherwise, the control station does not adjust the network topology structure of the M2M network.

Here, the test report sent by each node may be information in response to the inquiry of the control station, and also may be initiatively sent to the control station by the terminal.

Figure 2:
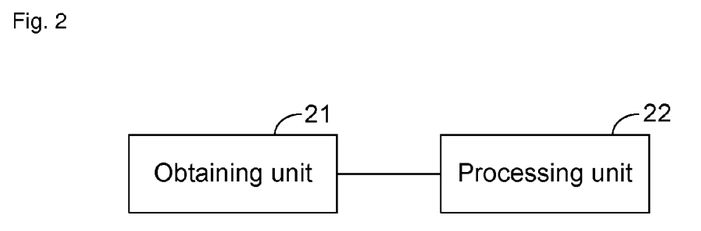
FIG. 2 is a structural diagram of a device for managing network topology structure of an M2M network according to the disclosure.

The disclosure provides a device for managing network topology structure of an M2M network, as shown in FIG. 2, the device mainly includes: an obtaining unit 21 and a processing unit 22, wherein:

the obtaining unit 21 is configured to obtain wireless link information of an M2M network;

a processing unit 22 is configured to complete establishment and/or adjustment of network topology structure of the M2M network according to the wireless link information obtained by the obtaining unit 21.

The device for managing network topology structure of an M2M network may be arranged in the control station of the M2M network, and also may be arranged in the M2M network as an independent entity and connected with the control station. Through the device, the specific process of managing the network topology structure of an M2M network may refer to the following three embodiments.

Embodiment 1

In the embodiment, the process of managing the network topology structure of an M2M network will be described in detail below in a case where each gateway or each terminal is determined to be accessed to the M2M network as a sub-control station.

First, the process that the control station obtains wireless link information in the M2M network includes:

the control station obtains wireless link information of links between the control station and subordinate nodes directly connected with the control station; each sub-control station in subordinate nodes of the control station obtains wireless link information of links between each sub-control station and subordinate nodes directly connected with each sub-control station, and reports the obtained wireless link information to the control station.

Here, the control station may include one or more of the following network elements: macro base station, micro base station, pico base station and relay station; and the sub-control station may include: gateway, terminal and relay station.

Specifically, the process that the control station or sub-control station obtains wireless link information of links between the control station or sub-control station and is subordinate nodes thereof includes: the control station or each sub-control station sends a detection signal to subordinate nodes directly connected with the control station or each sub-control station via a downlink; the subordinate nodes detect the state of links, and feed back the detection results containing wireless link information to the control station or sub-control station via an uplink.

Here, the control station or sub-control station may obtain wireless link information by sending a detection signal such as a synchronization signal to its subordinate nodes or by sending a message for inquiring the situation of subordinate nodes, such as a periodic polling request or inquiry request; the detection results sent from subordinate nodes to the control station or sub-control station may include: ranging signal, or scanning report message or the like. The control station may obtain the signal sending strength information of the terminal in subordinate nodes according to the ranging signal.

Wherein, the ranging signal includes the orthogonal access code of the subordinate node, the orthogonal access code is used for identifying the position of the subordinate node in the M2M network, and the ranging signal may also include information, such as sending time and/or sending frequency.

During practical application, when a plurality of subordinate nodes are located in a same position, the plurality of subordinate nodes may use a same orthogonal access code to identify their own position, and subordinate nodes in the same position are distinguished by sending time and/or sending frequency, so that the access of a large number of terminals can be achieved via limited number of orthogonal access codes. When there is only one subordinate node in each position, both the position of the subordinate node and the subordinate node itself can be identified via the orthogonal access code.

Specifically, the way of reporting wireless link information to the control station by the sub-control station includes: periodically reporting, and/or reporting after periodically polling of the control station, and/or reporting in response to the request of the control station, and/or non-periodically initiative reporting and the like.

Figure 3:
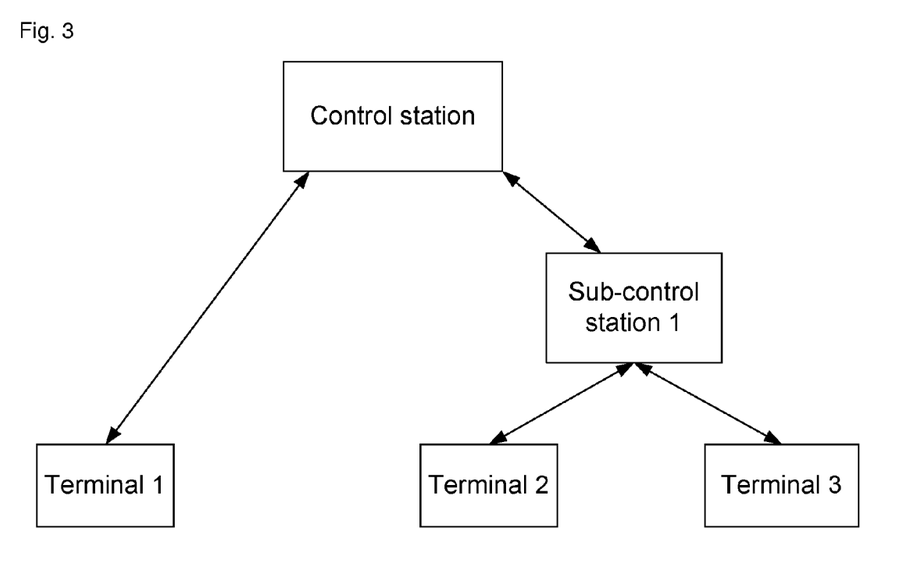
FIG. 3 is a structural diagram of an M2M network system.

Here, subordinate nodes of the control station include sub-control stations directly connected with the control station, and terminals; and subordinate nodes of the sub-control station include terminals directly connected with the sub-control station, for example, for an M2M network system shown in FIG. 3, subordinate nodes of the control station include terminal 1 and sub-control station 1; subordinate nodes of the sub-control station 1 include terminal 2 and terminal 3.

Secondarily, the process that the control station completes establishment of the network topology structure of the M2M network according to the obtained wireless link information may include: the control station identifies a sub-control station and/or terminal that newly accesses the network according to the obtained wireless link information, and completes access of a new terminal and/or new gateway to the network and access of the new terminal to the sub-control station and other processes.

Specifically, the control station or sub-control station obtains the signal sending strength information of the terminal according to the ranging signal sent by the subordinate nodes, and sends a ranging response message to a subordinate node according to the signal sending strength information of the terminal; and then the subordinate node sends an access request to the control station according to the ranging response message; the control station identifies the subordinate node according to the access request, and the access process is completed.

During practical application, when the control station or sub-control station sends a ranging response message to subordinate nodes, it may send the ranging response message in different power according to the positions of the subordinate nodes. For example, the control station or sub-control station parses out the position of each subordinate node according to the orthogonal access code in the ranging signal, for a subordinate node close to the control station, the ranging response message is sent in a small power, in this way, interference to the M2M network system can be reduced.

Here, the control station also stores network topology information obtained during the establishment of the network topology structure.

Further, the process of adjusting the network topology structure of an M2M network may include: the control station completes handover of each terminal in the M2M network and access of a gateway to the network and/or quit of a gateway from the network according to the obtained wireless link information, and the control station may also update the network topology information stored in the control station.

Besides, the method for managing the network topology structure of an M2M network also includes: the control station sends the network topology information, which is obtained during the establishment of the network topology structure and after the network topology structure is adjusted, to subordinate nodes or each node in the M2M network.

Here, the control station may initiatively send network topology information to subordinate nodes of the control station or each node in the M2M network, and may also send network topology information in response to the request of each node; the way of sending the network topology information includes: broadcast, and/or multicast, and/or unicast and so on.

Specifically, the way of sending the network topology information may include: the control station broadcasts or multicasts the network topology information to sub-control stations directly connected with the control station, and terminals, and then the sub-control station sends the network topology information to its subordinate nodes by means of broadcast or multicast or unicast; or, the control station unicasts the network topology information to sub-control stations directly connected with the control station, and then the sub-control station sends the network topology information to its subordinate stations by means of broadcast or multicast or unicast; wherein, when the network topology information is sent by means of multicast, information to be multicast, such as multicast connection identifier, may be included in one broadcast message to be sent, different multicast groups receive corresponding multicast information according to the multicast connection identifier in the broadcast message.

For an M2M network system as shown in FIG. 3, the control station sends the is network topology information to terminal 1 and sub-control station 1 which have wireless links with the control station, and then the sub-control station 1 sends the network topology information to terminal 2 and terminal 3 which have wireless links with the sub-control station 1.

Sending network topology information to each node by the control station may also be achieved by employing corresponding policies, for example, explicit policy or implicit policy.

Here, the explicit policy means that: the control station sends network topology information to each node, each node stores the network topology information in a table, and when the network topology information is updated, each node updates the network topology information table stored in the node according to the network topology information sent by the control station. In the explicit policy, the control station may also store the index of the network topology information table of each node, and the index may be the identifier of each node in the M2M network.

Implicit policy means that: the identifier of each node stored in the control station includes network topology information, the correspondence relation between the identifier and the topology information is known as a default rule in the network before the network is established, each node also includes the network topology information sent by the control station in own identifier, so that the network topology information can be read conveniently as required.

For example, for an M2M network system shown in FIG. 3, the access flow of terminal 1 includes the following steps.

Step 1: after started, terminal 1 searches for an M2M network which terminal 1 can access on one or more pre-configured wireless links.

Here, terminal 1 is pre-configured with a wireless link between terminal 1 and the control station shown in FIG. 3.

Step 2: the control station sends a synchronization signal, for example, preamble signal, in the M2M network by means of broadcast.

Step 3: terminal 1 receives the synchronization signal from the control station, completes downlink synchronization and uplink synchronization, and sends a ranging signal to the control station.

Wherein, the ranging signal includes orthogonal access code for identifying the position of terminal 1, and/or sending time and sending frequency and other information.

Step 4: according to the ranging signal, the control station obtains the signal sending strength information of terminal 1 and feeds back a ranging response message to terminal 1, and the ranging response message includes identifier information of terminal 1, such as orthogonal access code, and/or information of time/frequency of the ranging signal.

Here, the signal sending strength information of the terminal obtained by the control station is specifically the information indicating strength of the ranging signal sent by the terminal.

Wherein, the ranging response message also includes identifier information indicating whether ranging is successful, and/or prompt information of adjusting the ranging signal sending strength. If the control station can correctly decode the ranging signal sent by the terminal, according to the obtained signal sending strength information of the terminal, then ranging is successful, and identifier information indicating that ranging is successful is included in the ranging response message to be sent; otherwise, ranging is unsuccessful, identifier information indicating that ranging is unsuccessful and prompt information of adjusting the ranging signal sending strength are included in the ranging response message to be sent.

Step 5: terminal 1 receives the ranging response message, and determines whether the message is corresponding to terminal 1 according to the orthogonal access code in the ranging response message, if the message is corresponding to terminal 1 and the ranging response message includes identifier information indicating that ranging is successful, continue to execute Step 6; otherwise, returns to Step 3.

Step 6: terminal 1 sends to the control station a request of accessing the current M2M network, the control station processes the access of terminal 1 to the current M2M network according to the request, and updates the network topology information of the current M2M network.

Here, the request of accessing the current M2M network sent by terminal 1 may include the physical address of terminal 1, for example, Media Access Control (MAC) address, and the physical address of terminal 1 serves as the identity identifier of terminal 1 in the M2M network after terminal 1 accesses the M2M network.

Step 7: the control station sends the updated network topology information of the M2M network to terminal 2 and terminal 3 via sub-control station 1 in the current M2M network, in order to notify the updated network topology structure to each node in the current M2M network.

Here, the network topology information sent by the control station may be an explicit network topology structure indication, for example, it includes identity identifier of terminal 1 and information identifying the position of terminal 1 in the M2M network; and the network topology information sent by the control station may also be an implicit network topology structure indication, for example, it includes identity identifier of terminal 1 only. If necessary, other terminals in the M2M network, such as terminal 2, may obtain information of the position of terminal 1 from the control station according to the identity identifier of terminal 1.

For an M2M network system shown in FIG. 3, after terminal 1 accesses the network, if necessary, adjusting the network topology structure of the M2M network is performed, the process includes:

Step 1: when terminal 1 in the current M2M network periodically sends a test signal, such as periodic ranging signal, to the control station, terminal 2 and terminal 3 periodically send a test signal, such as periodic ranging signal, to the control station via control station 1, so as to report position information and/or function information of terminal 2 and terminal 3.

Step 2: the control station detects whether the test signal sent by each terminal is received within a predetermined period of time, if yes, turns to Step 3; otherwise, returns to Step 4.

Step 3: the control station compares normal working conditions of terminal stored in the control station with the report information, determines whether terminals have problems such as position abnormality or function fault, if so, turns to Step 4; otherwise, returns to Step 1.

Step 4: the control station determines that one or more terminals have fault, and continues to execute Step 5.

Specifically, if the control station receives no test signal sent by any terminal within the predetermined period of time, the control station may initiatively send inquiry information to the terminal again, if the control station still receives no feedback information returned by the terminal, then the control station determines that the terminal has fault.

Step 5: the control station deletes the terminal in fault from the current M2M network, sends new network topology information to other terminals in the current M2M network after deleting relative information such as identity identifier of the terminal in fault in the current stored network topology information, and completes the adjustment of the network topology structure of the current M2M network.

Embodiment 2

In the embodiment, the process of managing the network topology structure of an M2M network will be described in detail below in a case where each terminal is not determined to be accessed to the M2M network as a sub-control station.

Figure 4:
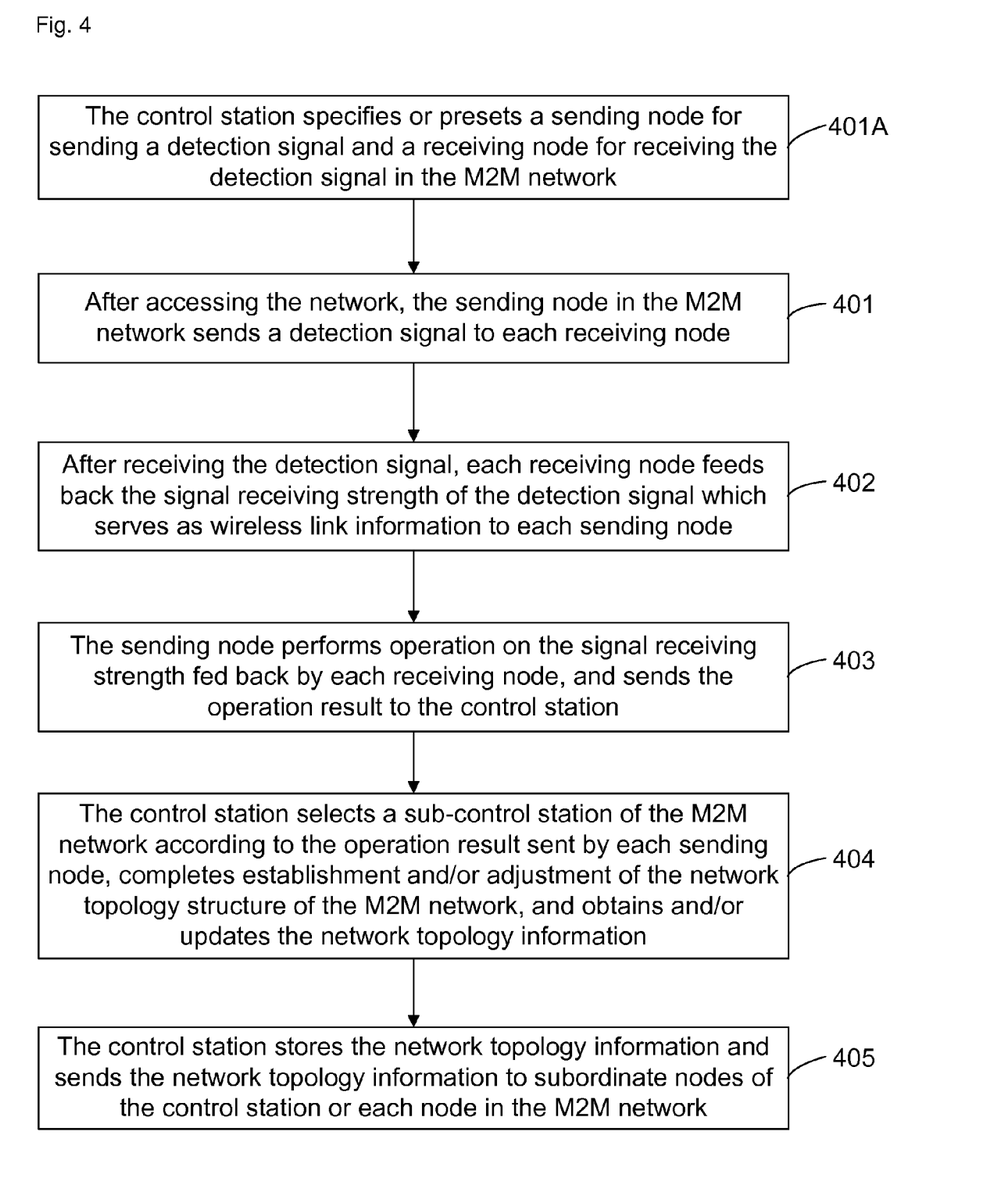
FIG. 4 is a flowchart illustrating specific implementation of a method for managing network topology structure of an M2M network according to the disclosure.

With reference to FIG. 4, the process of managing the network topology structure of an M2M network includes the following steps.

Step 401: after accessing the network, each sending node in the M2M network sends a detection signal to each receiving node.

Here, the detection signal may also be the ranging signal.

Step 402: after receiving the detection signal, each receiving node feeds back the signal receiving strength of the detection signal which serves as wireless link information to each sending node.

Step 403: the sending node performs operation on the signal receiving strength fed back by each receiving node, and sends the operation result to the control station.

Specifically, the sending node may obtain the operation result containing the average signal receiving strength of the sending node by calculating the average value of signal receiving strength returned by each receiving node.

Step 404: the control station selects a sub-control station of the M2M network according to the operation result sent by each sending node, completes establishment and/or adjustment of the network topology structure of the M2M network, and obtains and/or updates the network topology information.

Here, the control station selects a node with the most balanced signal receiving strength as the sub-control station, or selects a node with the maximum signal receiving strength as the sub-control station, according to the operation result sent by each sending node.

Specifically, when each terminal accesses the M2M network and the sub-control station is not determined, the control station first determines the sub-control station of the M2M network according to the operation result sent by each sending node, completes establishment of the topology structure of the M2M network, and obtains and stores the network topology information; and then, when there are terminals or gateways access the M2M network, the control station adjusts the sub-control station of the M2M network according to the operation result sent by each sending node, and updates the stored network topology information.

Step 405: the control station stores the obtained and/or updated network topology information and sends the obtained and/or updated network topology information to subordinate nodes of the control station or each node in the M2M network.

Here, the network topology information obtained by the control station include: in the M2M network, information of each sub-control station directly connected with the control station, information of subordinate nodes of each sub-control station, connection information of the control station and each sub-control station, and connection information of each sub-control station and subordinate nodes thereof. Specifically, the way of sending the network topology information is the same as that in Embodiment 1.

Before Step 401, before each sending node sends a detection signal to each receiving node, the process of managing the network topology structure of an M2M network further includes:

Step 401A: the control station specifies or presets a sending node for sending a detection signal and a receiving node for receiving the detection signal in the M2M network.

Wherein, in Steps 403-404, the process of determining a sub-control station may also be as follows: each sending node sends its operation result to other sending nodes in the M2M network by means of broadcast after obtaining the operation result; each sending node determines, after obtaining its operation result and the operation results of other sending nodes, whether it can serve as a sub-control station according to the obtained operation results.

Each node serving as the sub-control station completes establishment and/or adjustment of the network topology structure of the wireless transmission sub-network in which the node is located, and sends the obtained or updated network topology information to the control station. Specifically, each sending node determines whether it can serve as a sub-control station according to whether the signal receiving strength is balanced or whether the signal receiving strength is maximum.

Figure 5:
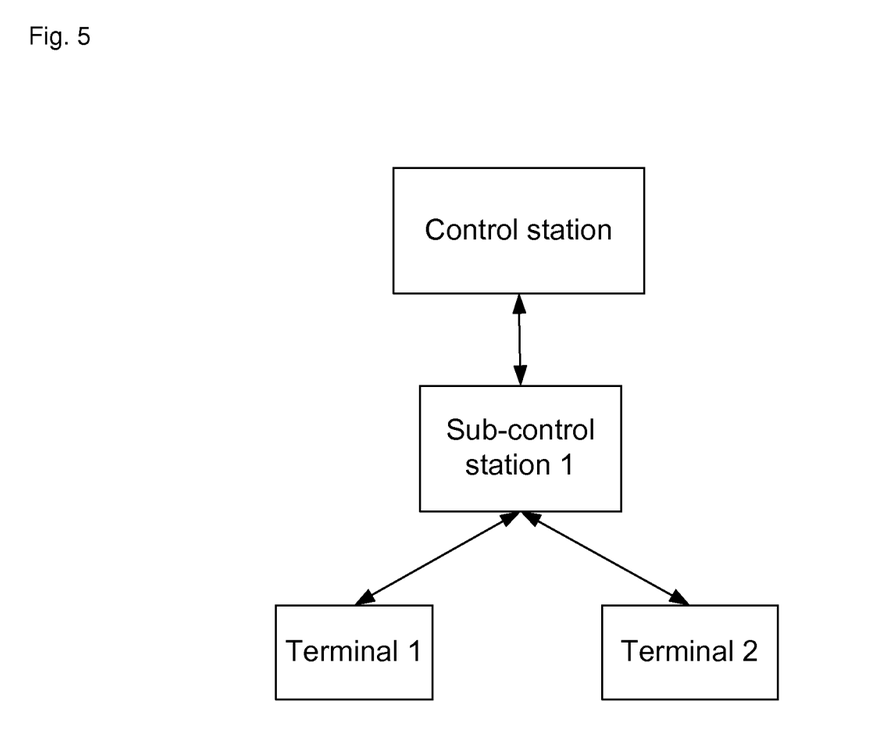
FIG. 5 is a structural diagram of another M2M network system.

The embodiment can be applied in the management of the network topology structure of an M2M network in the M2M network system shown in FIG. 5, in the M2M network system, subordinate nodes of the control station include sub-control station 1, and subordinate nodes of sub-control station 1 include terminal 1 and terminal 2.

Embodiment 3

In the embodiment, the process of managing the network topology structure of an M2M network when the sub-control station is adjusted will be described in detail below.

In the M2M network, the change of the network topology structure of the M2M network is caused by adjustment of the sub-control station, for example, when a sub-control station is replaced or there is a sub-control station quits from the M2M network, the sub-control station needs to transfer the control over its subordinate nodes to the control station or other sub-control stations, this transformation may be achieved by handing over subordinate nodes or accessing the network again after quitting from the sub-control station.

Specifically, when it is needed to replace the sub-control station or a sub-control station quits from the M2M network, by the process of managing the network topology structure of the M2M network in Embodiment 2, the sub-control station of the M2M network is adjusted and a new sub-control station is determined, such that the new sub-control station obtains the control over subordinate nodes of the original sub-control station, the subordinate nodes of the original sub-control station access the network again after quitting from the wireless transmission sub-network of the original sub-control station, or are directly switched to the wireless transmission sub-network in which the new sub-control station is located. Or, by the process of obtaining wireless link information of the M2M network in Embodiment 1, after the wireless link information of the M2M network is obtained, the sub-control station of the M2M network is adjusted according to the wireless link information, and further the new sub-control station is determined.

Here, for a case where a sub-control station quits from the M2M network, during the process of adjusting the sub-control station of the M2M network, the original sub-control station does not participate in this process, so as to reduce interference and determine the new sub-control station more accurately.

Wherein, the control of the sub-control station includes permission to the following actions: create network topology structure of the wireless transmission sub-network in which sub-control station is located, and/or take charge of adjusting the network topology structure of the wireless transmission sub-network and reporting the network topology information of the wireless transmission sub-network to the control station.

The above contents are only preferred embodiments of the disclosure and are not used for limiting the disclosure. Any modifications, equivalent replacements and improvements made within the spirit and principle of the disclosure should be within the protection scope of the disclosure.

The invention claimed is:

1. A method for managing network topology structure of a Machine to Machine (M2M) network, comprising:
obtaining wireless link information of the M2M network by a control station of the M2M network;
completing, according to the obtained wireless link information, establishment and/or adjustment of network topology structure of the M2M network by the control station,
wherein the process of obtaining wireless link information of the M2M network comprise:
the control station obtains wireless link information of links between the control station and subordinate nodes directly connected with the control station; each sub-control station in subordinate nodes of the control station obtains wireless link information of links between each sub-control station and subordinate nodes directly connected with each sub-control station, and reports the obtained wireless link information to the control station.

2. The method according to claim 1, wherein the process that the control station or sub-control station obtains wireless link information of links between the control station or sub-control station and subordinate nodes thereof comprises: the control station or each sub-control station sends a detection signal to subordinate nodes directly connected with the control station or each sub-control station via a downlink; the subordinate nodes detect the state of links, and feed back detection results containing wireless link information to the control station or sub-control station via an uplink.

3. The method according to claim 1, wherein the way of reporting wireless link information to the control station by the sub-control station comprises: periodically reporting, and/or reporting after periodically polling of the control station, and/or reporting in response to request of the control station, and/or non-periodically initiative reporting.

4. The method according to claim 1, wherein the process that the control station completes establishment of network topology structure of the M2M network comprises: the control station identifies a sub-control station and/or terminal that newly accesses the network according to the obtained wireless link information, and completes access of a new terminal and/or new gateway to the network and access of the new terminal to the sub-control station.

5. The method according to claim 1, wherein the process that the control station completes adjustment of network topology structure of the M2M network comprises: the control station completes handover of each terminal in the M2M network and access of a gateway to the network and/or quit of a gateway from the network according to the obtained wireless link information.

6. The method according to claim 1, wherein the process of obtaining wireless link information of the M2M network comprises:
after accessing the network, a sending node in the M2M network sends a detection signal to each receiving node; after receiving the detection signal, each receiving node feeds back signal receiving strength of the detection signal which serves as wireless link information to each sending node; each sending node performs operation on the signal receiving strength fed back by each receiving node, and sends an operation result to the control station.

7. The method according to claim 6, wherein the process that the control station completes establishment and/or adjustment of network topology structure of the M2M network comprises: the control station selects a node with the most balanced signal receiving strength as the sub-control station, or selects a node with the maximum signal receiving strength as the sub-control station, according to the operation result sent by each sending node.

8. The method according to claim 1, wherein when it is needed to replace a sub-control station or a sub-control station quits from the M2M network, the management of network topology structure of the M2M network comprise: the control station obtains wireless link information of the M2M network, and according to the wireless link information, adjusts the sub-control station of the M2M network and determines a new sub-control station, so that the new sub-control station obtains the control over subordinate nodes of the original sub-control station.

9. The method according to claim 1, further comprising: after establishing and/or adjusting the network topology structure, the control station sends the network topology information obtained during establishment of the network topology structure and/or network topology information updated during adjustment of the network topology structure to subordinate nodes or each node in the M2M network.

10. The method according to claim 9, wherein the way of sending the network topology information comprises: broadcast, and/or multicast, and/or unicast.

11. The method according to claim 1, wherein the wireless link information comprises one or more of the following parameters: channel signal to interference ratio and/or signal to noise ratio and/or signal to interference plus noise ratio, packet loss ratio and/or packet error ratio of wireless links, processing of wireless links and/or transmission delay, actual throughput of wireless links, resources configured for wireless links, signal receiving strength information of terminals, signal sending strength information of terminals, and information indicating whether terminal communication links exist.

12. A control station for managing network topology structure of a Machine to Machine (M2M) network, comprising: an obtaining unit and a processing unit, wherein:
   the obtaining unit is configured to obtain wireless link information of the M2M network;
   the processing unit is configured to complete establishment and/or adjustment of network topology structure of the M2M network according to the wireless link information obtained by the obtaining unit,
wherein the control station obtains wireless link information of links between the control station and subordinate nodes directly connected with the control station; each sub-control station in subordinate nodes of the control station obtains wireless link information of links between each sub-control station and subordinate nodes directly connected with each sub-control station, and reports the obtained wireless link information to the control station.

* * * * *